US010890897B2

(12) United States Patent
Denayer et al.

(10) Patent No.: US 10,890,897 B2
(45) Date of Patent: Jan. 12, 2021

(54) ASSEMBLY OF A MODULAR STRUCTURE

(71) Applicant: International Business Machines Corporation, Armonk, NY (US)

(72) Inventors: Wouter Denayer, Merelbek (BE); Rick A. Hamilton, II, Charlottesville, VA (US); Stephane Massonet, Antwerp (BE); Bert Schoofs, Brussels (BE)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 15/715,421

(22) Filed: Sep. 26, 2017

(65) Prior Publication Data

US 2019/0094841 A1    Mar. 28, 2019

(51) Int. Cl.
*A63H 33/04* (2006.01)
*G05B 19/418* (2006.01)

(52) U.S. Cl.
CPC ..... *G05B 19/41805* (2013.01); *A63H 33/042* (2013.01); *G05B 2219/31001* (2013.01);
(Continued)

(58) Field of Classification Search
CPC ......................... G06F 17/15; G06T 2219/2008
See application file for complete search history.

(56) References Cited

U.S. PATENT DOCUMENTS

| 8,079,890 B2 | 12/2011 | Seligman |
| 2013/0171608 A1 | 7/2013 | Chetlapalli et al. |

(Continued)

FOREIGN PATENT DOCUMENTS

| CN | 202061387 U | 12/2011 |
| CN | 202061388 U | 12/2011 |

(Continued)

OTHER PUBLICATIONS

Boaz Almog, Brixo—Building Blocks Meet Electricity and IOT, kickstarter.com, Copyright 2016, Retrieved from Internet: URL: https://www.kickstarter.com/projects/1068475467/brixo-building-blocks-meet-electricity-and-iot, 15 pages.

(Continued)

*Primary Examiner* — Jay Trent Liddle
*Assistant Examiner* — Alex P. Rada, II
(74) *Attorney, Agent, or Firm* — Schmeiser, Olsen & Watts, LLP; Nicholas L. Cadmus

(57) ABSTRACT

A method and system for assembling a modular structure from components configured to be fitted together to create the modular structure in accordance with a construction plan. Each component includes: a communication interface; and an output interface configured to generate sensory signals. The components communicate, via the communication interface of each component, with a controller to establish an availability of the components for the modular structure. A target component is determined at the controller from the components based on the construction plan and the availability of the components. The target component is a starting component used for initiating creation of the modular structure in accordance with the construction plan. A first sensory signal indicating the target component to a user is generated by the output interface of the target component.

25 Claims, 11 Drawing Sheets

(52) U.S. Cl.
CPC .............. *G05B 2219/40304* (2013.01); *G05B 2219/45067* (2013.01)

(56) References Cited

U.S. PATENT DOCUMENTS

2018/0056205 A1* 3/2018 Lu .................. A63H 33/046
2018/0280822 A1* 10/2018 Murthy ............... A63H 33/086

FOREIGN PATENT DOCUMENTS

| CN | 106823408 | 6/2017 |
| WO | WO2012160057 | 11/2012 |
| WO | WO2015173246 | 11/2015 |

OTHER PUBLICATIONS

Trevor English, Building Blocks Integrated With Electricity and Bluetooth!, interestingengineering.com, Gadgets, Mar. 23, 2016, Retrieved from Internet: URL: http://interestingengineering.com/building-blocks-fully-integrated-with-electricity/, 5 pages.

Gotzen et al., Multimodel Design for Enactive Toys, R. Kronland-Martinet, S. Ystad, and K. Jensen (Eds.): CMMR 2007, LNCS 4969, pp. 212-222, 2008. c Springer-Verlag Berlin Heidelberg 2008.

Charles Q. Choi, 'Smart' Blocks Turn Lego Creations into Web-Connected Toys, Live Science Contributor, Jun. 7, 2016 12:15pm ET, Retrieved from Internet: URL: http://www.livescience.com/54997-brixo-electric-blocks-for-lego.html, 6 pages.

GB920170003PCT1 ISR and WO, Jan. 22, 2019, 11 Pages.

* cited by examiner

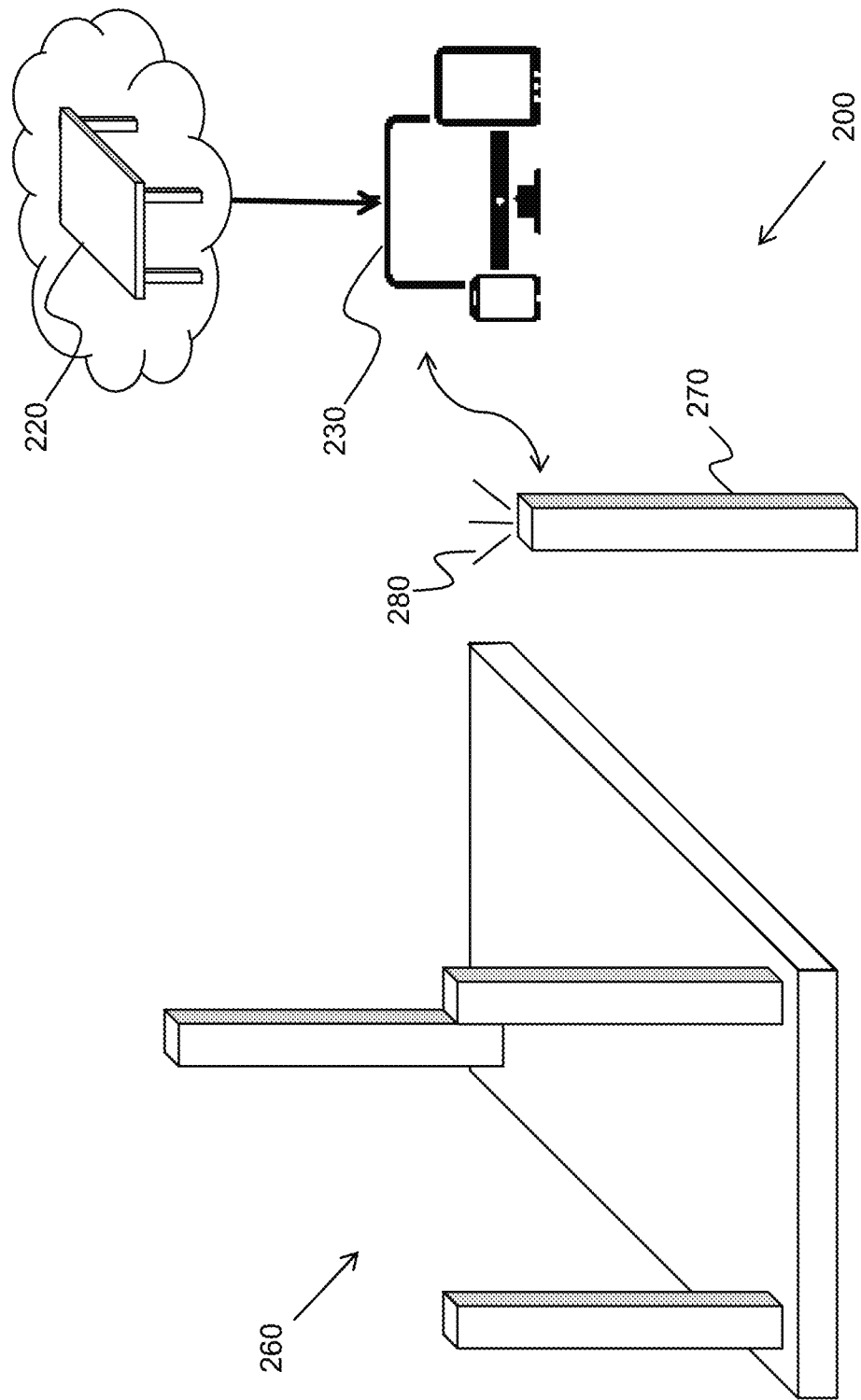

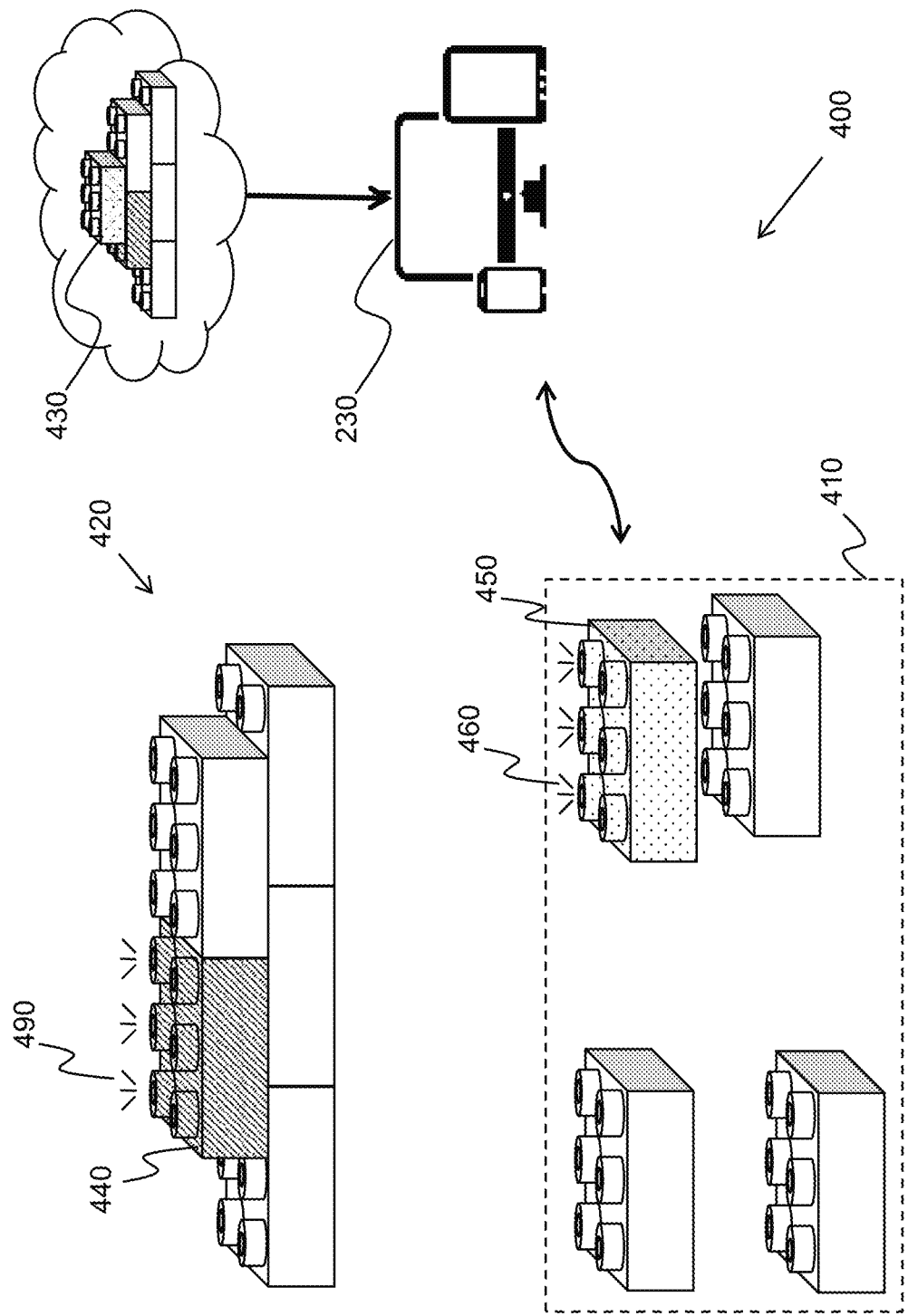

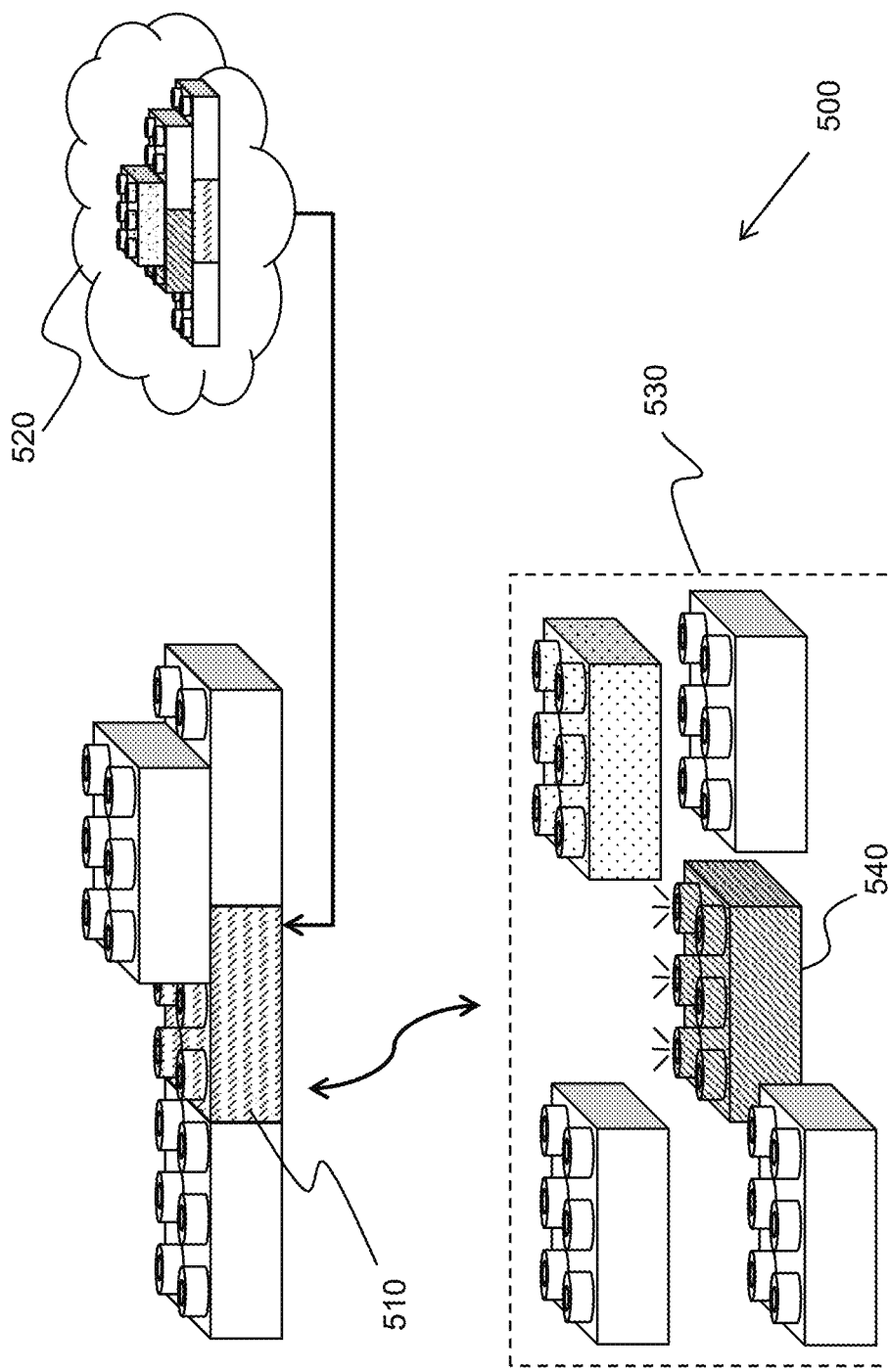

ASSEMBLY OF A MODULAR STRUCTURE

TECHNICAL FIELD

The present invention relates to the field of modular structures, and more particularly to assembling a modular structure from components adapted to be fitted together to create the modular structure.

BACKGROUND

It is widely known to provide components that are adapted to be fitted together to create structures. For instance, a collection of components may be provided along with assembly instructions defining how the components should be fitted together so as to create a structure according to a predefined model. By fitting together the components according to the assembly instructions, a user can assemble the structure, thereby enabling the provision of a structure to a user in a disassembled state. Widely-known examples of such structures that a user assembles from component parts include flat-pack furniture and toy building block sets.

The process of assembling a structure from components may typically follow a predefined model. Generally, a user has to understand the model before assembling the structure.

However, a user may diverge (intentionally or unintentionally) from the predefined model so as to create a different structure from that defined by the model. In some instances, such as the assembly of furniture, diverging from the predefined model may not be desirable or recommended.

SUMMARY

Embodiments of the present invention provide a method, and associated computer system and computer program product, for assembling a modular structure from a plurality of components configured to be fitted together to create the modular structure in accordance with a construction plan. Each component comprises: a communication interface, and an output interface configured to generate sensory signals. The plurality of components communicate, via the communication interface of each component, with a controller to establish an availability of the plurality of components for the modular structure. A target component determines, at the controller, a target component from the plurality of components based on the construction plan and the availability of the plurality of components, wherein the target component is a starting component used for initiating creation of the modular structure in accordance with the construction plan. A first sensory signal indicating the target component to a user is generated by the output interface of the target component.

BRIEF DESCRIPTION OF THE DRAWINGS

FIGS. 2A and 2B depict an apparatus relating to flat-pack furniture, in accordance with embodiments of the present invention.

FIGS. 5A to 5C depict an apparatus relating to the toy building blocks shown in FIGS. 3 and 4, in accordance with embodiments of the present invention.

FIGS. 6A to 6C depict an apparatus that is similar to the apparatus in FIGS. 5A to 5C, in accordance with embodiments of the present invention.

DETAILED DESCRIPTION

Figure 1:
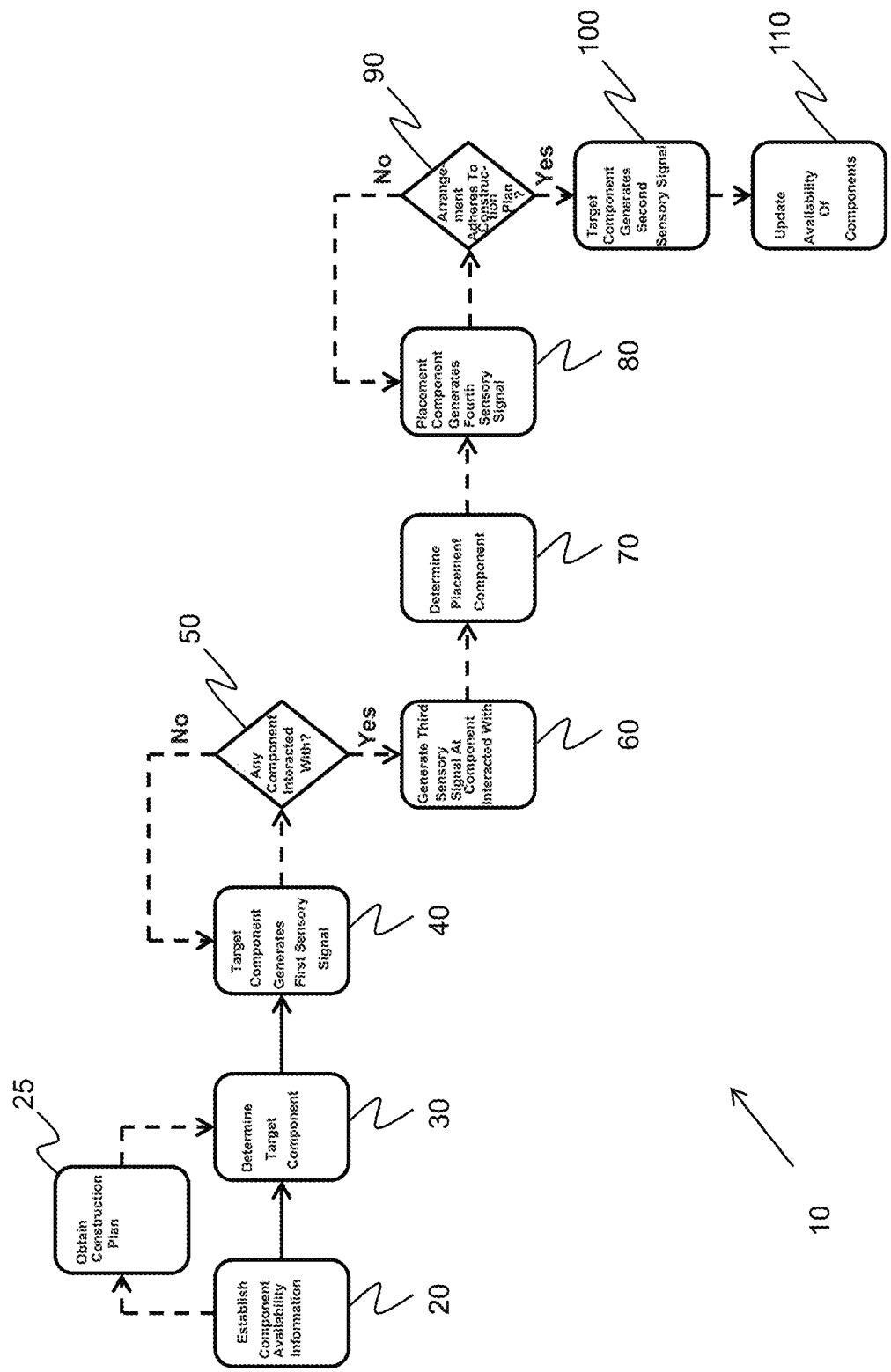
FIG. 1 depicts a flow chart of a method for assembling a modular structure from a plurality of components adapted to be fitted together to create the modular structure, in accordance with embodiments of the present invention.

It should be understood that the Figures are merely schematic and are not drawn to scale. It should also be understood that the same reference numerals are used throughout the Figures to indicate the same or similar parts.

An embodiment of the present invention provides a method for assembling a modular structure from a plurality of components adapted to be fitted together to create the structure where each component comprises: a communication interface; and an output interface adapted to generate sensory signals. The method comprises the plurality of components communicating with a controller to establish an availability of the plurality of components for the structure. The method also comprises determining, at the controller, a target component from the plurality of components based on a construction plan and the availability of the plurality of components. The method further comprises generating, with the output interface of the target component, a first sensory signal for indicating (i.e., identifying) the target component to a user.

The present invention provides a method for assembling a modular structure from a plurality of components, wherein the components are adapted to form the modular structure when fitted together. Each component may be in communication with a controller, thereby enabling the controller to establish information on the components, such as availability of the components. In addition, the controller may have access to a construction plan for assembling the modular structure. The controller may compare the available components with the construction plan and, based on this comparison, determine a target component. For example, the target component may be one component of the plurality of components that is best suited to the current stage of assembly of the modular structure. The target component, in communication with the controller, may be made aware of this determination of the target component and, by way of an output interface, may indicate the target component to the user by outputting a first sensory signal.

By determining a target component at a controller and the target component generating a sensory output to indicate the target component to the user, embodiments of the present invention may allow a user to easily locate and select the correct component for use in the current stage of assembling the modular structure. In this way, and by way of example only, a user may be guided through the assembly of a modular structure from a plurality of components without needing to refer to a separate set of instructions.

Embodiments of the present invention may thus provide for a simplification of the process of assembling a modular structure from a plurality of components. By way of example, the controller may obtain a construction plan which may comprise information on how to assemble a modular structure from a set of toy building blocks. The controller may also be in communication with a plurality of toy building blocks, adapted to form the modular structure when fitted together. Through this communication, the controller may establish the availability, and characteristics, of each toy building block of the plurality of toy building blocks, which may then be used in combination with the construction plan to determine which toy building block should be used in the current stage of assembly of the modular structure. This component (i.e., toy building block), designated as the target component, may indicate this component to the user by generating a first sensory signal.

Embodiments of the present invention may therefore enable a user to quickly and easily locate the next component required in the assembly of the modular structure without the need to refer to potentially complex instructions. Thus, it may be possible for a user with, for example, a learning disability to be guided through the process of assembling a modular structure that may have otherwise been too complex to complete. By way of example, a child with a learning disability may achieve an increased level of independence during play through the toy building blocks described above.

Embodiments of the present invention may further enhance the process of assembling a modular structure for any user. For example, the modular structure to be assembled may be a piece of flat-pack furniture, such as a table. In this case, the plurality of components may include a table top and the legs. A controller, such as the user's smartphone, may be communicatively linked with the plurality of components and establish the availability of the components. The availability may then be compared with a construction plan for the table and a target component, such as a leg, and may then be determined as the correct component for the current stage of assembly. The leg may then be controlled to indicate the leg to the user; e.g, by outputting a sensory signal, thereby removing the need for a user to search through and compare the components in order to find the correct component. The target leg may then be fixed in place using conventional means.

In this way, embodiments of the present invention may reduce the time taken to assemble a modular structure and may reduce, or even eliminate, the risk of using an incorrect component during an assembly stage which may reduce or compromise the integrity of the modular structure.

Further, embodiments of the present invention may provide improved flexibility to a user by adapting the construction plan to a choice of component of the user that does not match the original construction plan. Returning to the example of a set of toy building blocks, the controller may obtain a construction plan for a pattern that includes a red section and a blue section. As such, the controller may determine that a red building block is the target component, which then indicates the red building block to the user. However, rather than select the indicated red block, the user may select a green block. The controller may adapt the construction plan in response to this by, for example, altering the red section to become a green section.

Furthermore, many different ways to implement the present invention are available. For example, the controller may exist separately from the plurality of components or, in another example; the controller may be integral to one of the plurality of components.

In an embodiment, each component of the plurality of components may further comprise a detection unit adapted to detect placement of the component adjacent another component. The method may then further comprise: in response to detecting arrangement of the target component adjacent another component, determining if the arrangement of the target component adjacent another component adheres to the construction plan; and generating a second sensory signal for indicating if the arrangement of the target component adjacent another component adheres to the construction plan.

In an embodiment, a component may be capable of detecting the placement of another component adjacent to the component. In this way, a component may communicate to the controller information stating that another component, such as the target component, has been placed next to the component. The controller may then use this information to determine the arrangement of the target component and compare the arrangement of the target component to the arrangement contained within the construction plan. If the respective arrangements match, the controller may communicate to the target component that the arrangement of the target component is correct, which may then generate a second sensory signal, different from the first sensory signal, to indicate the correct placement to the user. In this way, the user may be further guided through the process of assembling a modular structure.

In some embodiments the method may further comprise, if it is determined that the arrangement of the target component adjacent another component adheres to the construction plan, updating the availability of the plurality of components. Such embodiments may allow an up-to-date record of the components that have and have not yet been used in the assembly of the modular structure to be accessed by the controller. By accessing an updated availability of the plurality of components, the controller may more accurately select the next target component to be used in the assembly, which may be particularly relevant to the case where two or more components share the same properties.

In an embodiment, the detection unit may further comprise a light sensor. Embodiments may then further comprise: in response to detecting light incident on the light sensor, determining an arrangement of the target component adjacent another component based on the detected light, which may enable the detection unit to more accurately detect the arrangement of the target component with respect to an adjacent component. By way of example, the placement of the target component adjacent to a fixed component may prevent light from reaching the light detector of the fixed component, thereby indicating through the change in light intensity, that the target component has been provided to the correct location. In a further example, the first sensory output generated by the target component may comprise light emitted by the target component. An existing component of the modular structure may detect this light emitted by the target component when the target component is placed adjacent to the existing component of the modular structure, thereby indicating the arrangement of the target component relative to the existing component. The existing component may indicate this detection to the controller, thereby enabling to controller to compare the target component's arrangement to the arrangement indicated in the construction plan.

In a further embodiment, the determining an arrangement of the target component adjacent another component may further be based on at least one of: a color of the detected light; and a variation of the detected light over time. By way of example, the first sensory output of the target block may comprise light of a predetermined color, such as red, which may be emitted in a specific blinking pattern. When the target component is placed on the modular structure, an adjacent component may detect the red blinking light, which may then be communicated to the controller. This red blinking light may act as a confirmation that both a component has been placed in the correct place and that the component is the correct target component, previously indicated to the user.

In an embodiment, the plurality of components may comprise first and second building blocks of a toy set.

The present invention may enable a user, such as a child, to be guided through the process of assembling a modular structure without the need to refer to complex instructions or to have an established understanding of the model.

In some embodiments, each building block may comprise a male connection portion at an upper end and a female connection portion at a lower end which may be releasably mateable with the male connection portion of the other building block, whereby the first building block may be connectable on top of the second building block in a first configuration and wherein the second building block may be connectable on top of the first building block in a second configuration.

In this way, it may be possible to construct and deconstruct the modular structure quickly without the need to use a separate fastening mechanism for each building block. Further, the building blocks may be used in multiple configurations as the building blocks may be adapted to fit together in any order.

In an embodiment, the first sensory signal may comprise at least one of: an audible signal; a visual signal; and a haptic signal. For example, the first sensory output may comprise a steady emission of white light from the target components. In a further example, the first sensory output may comprise a colored light, such as blue, which flashes in a predetermined pattern and is accompanied by a beeping sound. The combination of first sensory outputs may be adapted to a user's specific needs; for example, in the case of a user with visual impairment, a first sensory output may comprise an audible beeping sound and a vibration of the component. In this way, the indication of the target component may be altered and adapted to fit the needs of the user.

In some embodiments, each component of the plurality of components may further comprise an interaction sensor adapted to detect user interaction with the component, and the method may then further comprise: in response to detecting user interaction with a component, determining if the detected user interaction with the component adheres to the construction plan; and generating a third sensory signal for indicating if the user interaction with the component adheres to the construction plan.

In an example, the interaction sensor may comprise a motion sensor adapted to detect the motion of a component when moved by the user. A motion sensor may comprise an accelerometer, or any suitable means of detecting motion. Alternatively, or additionally, the interaction sensor may comprise a touch sensor adapted to detect the change in pressure when the user handles the component, which may be achieved by way of a piezoelectric element included in the component. In another example, the interaction sensor may comprise a proximity sensor, such as an infrared sensor, adapted to detect when a user enters a given proximity of the component. In yet another example, the interaction sensor may comprise a magnetic sensor adapted to detect a change in magnetic field, which may be employed in cases where a tool comprising a magnetic portion is used to manipulate the component, which may also comprise a magnetic portion.

In this way, it may be possible to confirm to the user that correct component has been selected. For example, a target component may be indicated to a visually impaired user by way of a first sensory output comprising a low pitched beeping. If the user picks up the target component, the interaction sensor may indicate that the component has been manipulated by the user, which may then be communicated to the controller which may then indicate that the moving or manipulated component is the target component. In response to the indication that the moving/manipulated component is the target component, the component may generate a third sensory output (e.g., a high pitched beep or noise) to indicate to the user that they have selected the correct component.

In an embodiment, the method may further comprise: determining, at the controller, a placement component from the plurality of components based on a construction plan and the availability of the plurality of components; and generating, with the output interface of the placement component, a fourth sensory signal for indicating the placement component to a user.

According to an aspect of this embodiment, a placement component may be determined and indicated to the user by way of a fourth sensory output, which may enable the user to locate the correct placement location for the target component, thereby eliminating the need for the user to refer to separate instructions or to have a preconceived understanding of the modular structure.

In some embodiments, the method may further comprise: obtaining the construction plan from at least one of: a data store provided by the controller or a component; a remotely provisioned database; and a user input. By way of example, for a set of toy building blocks, the set may be sold for the purpose of assembling a specific modular structure, such as a model of a car. In this case, the controller may be integrally formed within a block and may contain a preloaded construction plan for how to construct the car. In another example, a general set of blocks may be provided, wherein the controller is integrally formed within one of the blocks, which allows a user to load a desired construction plan onto the controller. In a further example, a set of blocks may be adapted to communicate with an external controller, such as a smartphone, which may then access a desired construction plan for guiding the user through assembling a desired modular structure from the set of blocks. In yet another example, a user may design a modular structure and an associated construction plan, which they may then upload to the controller. The controller may then establish the components that are available and guide the user, or another user, through the assembly of the designed modular structure.

In an embodiment, the availability may comprise component information for each component of the plurality of components, and wherein the component information for a component may comprise information describing at least one of: an identifier of the component; a physical attribute of the component; a capability of the component; a use status of the component; a connected status of the component; and an adjacent component of the component.

According to an aspect of this embodiment, the controller may establish all necessary information relating to the available components in order to accurately determine how the available components may be used in the assembly of the modular structure. As a simple example, a set of toy building blocks may be provided that comprises eight white, 1×1 cubes, to be used in the assembly of a larger 2×2 white cube. In this way, all of the components are identical and so the only information required of the components is whether the components are in use or available. In a more complex example, the plurality of components may comprise more than one hundred unique components, which may vary in color, shape and size. In this case, the controller may require information relating to the color, shape and size of each component in order to correctly determine the target component. The information relating to the components may be stored in a list, table or the like.

According to another embodiment of the present invention, there is provided a computer program product for assembling a modular structure from a plurality of components adapted to be fitted together to create the structure, wherein each component comprises: a communication interface; and an output interface adapted to generate sensory signals, the computer program product comprising a computer readable storage medium having program instructions embodied therewith, the program instructions executable by a processing unit to cause the processing unit to perform a method comprising: controlling the plurality of components to communicate with a controller to establish an availability of the plurality of components for the structure; determining a target component from the plurality of components based on a construction plan and the availability of the plurality of components; and controlling the output interface of the target component to generate a first sensory signal for indicating the target component to a user.

The computer-readable storage medium may be selected from the group consisting of a CD, a DVD, a flash memory card, a USB memory stick, a random access memory, a read-only memory, a computer hard disk, a storage area network, a network server, and an Internet server.

According to another embodiment of the present invention, there is provided a computer system comprising: a computer program product; and a processing unit adapted to perform all of the steps of method according to an embodiment by execution of the computer-readable program code of the computer program product.

According to another embodiment of the present invention, there is provided apparatus for assembling a modular structure, the system comprising: a plurality of components adapted to be fitted together to create the structure, wherein each component comprises: a communication interface; and an output interface adapted to generate sensory signals; and a controller, wherein the plurality of components are adapted to communicate with the controller to establish an availability of the plurality of components for the structure, and wherein the controller is adapted to determine a target component from the plurality of components based on a construction plan and the availability of the plurality of components, and wherein the output interface of the target component is adapted to generate a first sensory signal for indicating the target component to a user.

Thus, there may be proposed an apparatus for assembling a modular structure from a plurality of components, wherein the components are adapted to form the modular structure when fitted together.

According to another embodiment of the present invention, there is provided a component adapted to be fitted together with one more other components to create a modular structure, wherein the component comprises: a communication interface; and an output interface adapted to generate sensory signals, wherein the component is adapted to communicate with a controller to establish an availability of the components for the structure, and wherein the output interface is adapted to generate a first sensory signal for indicating the component to a user in response to receiving a control signal from the controller indicating that component is a target component. The component may comprise a toy building block.

Embodiments may be employed in building block toy sets. For instance, such systems may be adapted to guide a user through the process of assembling a modular structure using a building block toy set.

Embodiments may employ mobile computing devices, such as tablet computers, laptop computers, smart (e.g. internet-enabled) televisions or displays, smartphones or other communication devices, personal digital assistants (PDAs), or the like as controllers.

Embodiments may be employed in educational products, such as electronic circuit building sets, in order to guide users through the assembly process.

Illustrative embodiments may provide concepts for a method for assembling a modular structure from a plurality of components, wherein the components are adapted to form the structure when fitted together and each comprise a communication interface and an output interface. The concept may include: the plurality of components communicating with a controller to establish an availability of the plurality of components for the structure; determining, at the controller, a target component from the plurality of components based on a construction plan and the availability of the plurality of components; and generating, with the output interface of the target component, a first sensory signal for indicating the target component to a user.

Put another way, there may be provided a concept for a method of assembling a modular structure, wherein a user is guided through the assembly process by a controller. The controller may communicate with a plurality of components in order to establish availability of the components, which may then be compared to a construction plan. A target component may then be determined based on the comparison and indicated to the user by way of a first sensorysigmal.

FIG. 1 illustrates a flow chart of a method 10 for assembling a modular structure from a plurality of components adapted to be fitted together to create the modular structure, in accordance with embodiments of the present invention. The modular structure is assembled in accordance with the construction plan. Each component comprises a communication interface and an output interface adapted to generate sensory signals. The process may begin in step 20, wherein the components communicate with a controller to establish an availability of the components for the structure.

The availability (which may otherwise be thought of as availability information, such as information describing component availability and/or properties) may comprise component information for each of the plurality of components, such as: an identifier of the component; a physical attribute of the component, which may include size, shape and color; a capability of the component; a use status of the component; a connected status of the component; and an adjacent component of the component. The availability information may be stored by the controller and arranged in the form of a list, a table, a hierarchical data structure, database, or other suitably adapted data structure.

In step 25, a construction plan for the modular structure may be obtained from at least one of: a data store provided by the controller or a component; a remotely provisioned database; and a user input. The construction plan may be preloaded into the data store before the assembly process begins or may be loaded onto the data store during step 25. In another embodiment, for example when the controller comprises a smartphone, the user may select a construction plan from a remotely accessible database (e.g., via the internet). In this case, the controller may take account of the availability of the components, established in step 20, and actively retrieve a construction plan utilizing the available components.

In step 30, a target component may be determined from the plurality of components based on the construction plan and the availability of the plurality of components. In one embodiment, the construction plan may specify one or more components that can be used as a target component. In one embodiment, a component that may be used as a target component if available cannot be used as a target component if not available. The determination in step 30 may be performed at the controller. A target component is defined as a starting component used for initiating creation of the modular structure in accordance with the construction plan.

For example, a plurality of components may comprise ten components, wherein a first set of five components share a first color and shape and a second set of five components share a second color and shape, which is different from the first set. The controller may communicate with the components in order to establish information pertaining to the availability of the plurality of components, including each component's shape, color and whether or not component is being used. The preceding information may then be stored in a table. Each component may be individually described in the table, or the components may be arranged into two or more groups of similar properties, in which case the table may further record the number of components in each group.

Following establishment of the preceding information, the controller may begin to configure the construction plan obtained in step 20, utilizing the ten components. For example, the construction plan may use the ten components in an alternating pattern of first and second components. Based on this construction plan and the availability of the components, the controller may determine that a component belonging to the first set is the target component to be used as the starting point for the pattern. In the case that each component is individually identified in a table, the controller may determine the target component to be a specific component. However, in the case where identical, or similar, components are stored in groups, the controller may determine that any member of that group may be used as the target component.

In step 40, the target component determined in step 30 may generate a first sensory signal via the target component's output interface. The first sensory signal may comprise at least one of: an audible signal; a visual signal; and a haptic signal. In a simple form, the first sensory signal may comprise a single signal, such as a white light, an audible beep or a vibration. In a more complex example, the first sensory signal may comprise a combination of signals, such as a green flashing light, a high pitched beep and a repeating vibration. The first sensory signal may been directed to the user to indicate the target component.

Different users may respond in different ways to various signal combinations. It is possible to take account of user needs in order generate an appropriate sensory signal. For example, in the case of an epileptic user, flashing lights may be avoided and replaced by audible and haptic feedback. In a similar manner, a user with a visual impairment may require sensory signals to be audible and/or haptic; whereas, a deaf user may be better served with visual and/or haptic feedback. By taking these user needs into account, for example at the controller, the target component may be indicated to the user in an optimal manner.

If the components further comprise an interaction sensor adapted to detect user interaction with the component, the method may then progress to step 50. In step 50, it may be determined whether any of the plurality of components is being interacted with. If no interaction is detected, the method may return to step 40 and continue to indicate the target component to the user via the first sensory signal.

If user interaction, such as component movement, is detected in step 50, then the method may progress to step 60.

In step 60, a third sensory signal may be generated at the output interface of the component being interacted with to indicate if the movement adheres to the construction plan. In other words, the controller may check that the component being interacted with is the target component determined in step 30. The third sensory signal may differ from the first sensory signal depending on whether it is determined that the interaction adheres to the construction plan. For example, a movement of the target component may lead to the target component generating a green light as a third sensory signal, thereby indicating to the user that the correct component has moved; whereas, a movement of a different component may lead to the moved component generating a red light, thereby indicating to the user that an incorrect component has moved. As with the first sensory signal, the third sensory signal may comprise at least one of: an audible signal; a visual signal; and a haptic signal.

In several cases, such as furniture assembly, the target component determined in step 30 may be the only component that may be used at that stage of assembly in order to correctly assemble the modular structure. In these several cases, if the incorrect component is picked up, the component may generate a warning to the user that the moved component is not the target component determined in step 30. In other cases, such as toy building block sets, there may be many components that could be used at the current stage of assembly to perform the same function as the target component. In this case, the controller may not issue a warning to the user and may adapt the construction plan to account for the different component being used. In this way, the user, who may for example be a child, may depart from the original construction plan, thereby allowing for the development of creativity.

In step 70, the controller may determine a placement component from the plurality of components based on a construction plan and the availability of the plurality of components. In other words, the controller may determine a placement location for the target components.

In step 80, the placement component may generate a fourth sensory signal for indicating the placement component to a user.

Returning to the example of the simple alternating pattern, where the user has now placed the first component and a second component has been determined and indicated as the target component. The user may then pick up the indicated second component, which in turn generates a third sensory signal to the user to confirm that the correct component has been selected. The controller may then determine that the second component should be placed on top of the first component, based on the construction plan. The availability information may indicate that one first component is in use as part of the modular structure. Thus, based on both the availability information and the construction plan, the first component may be determined to be the placement component. The placement component may then generate a fourth sensory signal, different from the first and third sensory signals in order to indicate the placement component to the user. In some cases, such as when the fourth sensory signal comprises a visual signal, the placement component may be partially indicated in order to indicate a more specific placement area on the placement components. As with the first sensory signal, the third sensory signal may comprise at least one of: an audible signal; a visual signal; and a haptic signal.

In embodiments where the components do not include an interaction sensor, the method may progress from step 40 to 70, bypassing steps 50 and 60, so that the placement component may be determined and identified directly after the target component.

If the components further comprise a detection unit adapted to detect placement of a component adjacent another component, the method may then progress to step 90. In step 90, in response to detecting, by the detection unit of any component in the modular structure, the placement of the target, or moved component adjacent another component, the controller determines if the placement adheres to the construction plan. If so, step 100 is next executed. If not, the method returns to step 80.

Put another way, by detecting the placement of a component adjacent another component, which comprises part of the modular structure, the controller may compare the placement location of the target component with the location specified in the construction plan. In some cases, the detection unit may comprise a light sensor. In these cases, the determination of the arrangement of the target component adjacent another component may be based on the detected light. For example, the determining of the arrangement may be based on at least one of: a color of the detected light; and a variation of the detected light over time. By way of example, the first, or third, sensory signal of the target component may comprise light of a certain color, such as red, emitted in a pattern of flashes. The component adjacent the target component may detect these emissions and indicate to the controller that the target component has been placed adjacent to the adjacent component. As the controller knows the position of the adjacent component, through the availability information, the controller may compare the location of the target component to the location specified in the construction plan.

In another example, the target component may detect light emitted by the placement component as a fourth sensory signal. As before, the controller may then use this detection to check the placement of the target component against the construction plan.

In step 100, when placed, the target component may generate a second sensory signal for indicating if the arrangement of the target component adjacent another component adheres to the construction plan. In this way, the user may receive confirmation that the target component has been placed in the correct place according to the construction plan.

In step 110, the availability of the plurality of components is updated.

By updating the availability of the components, it may be possible to track which components are, or are not, in use as part of the modular structure. In this way, the controller may more accurately determine a target component for the next stage of the assembly process.

Figure 2A:
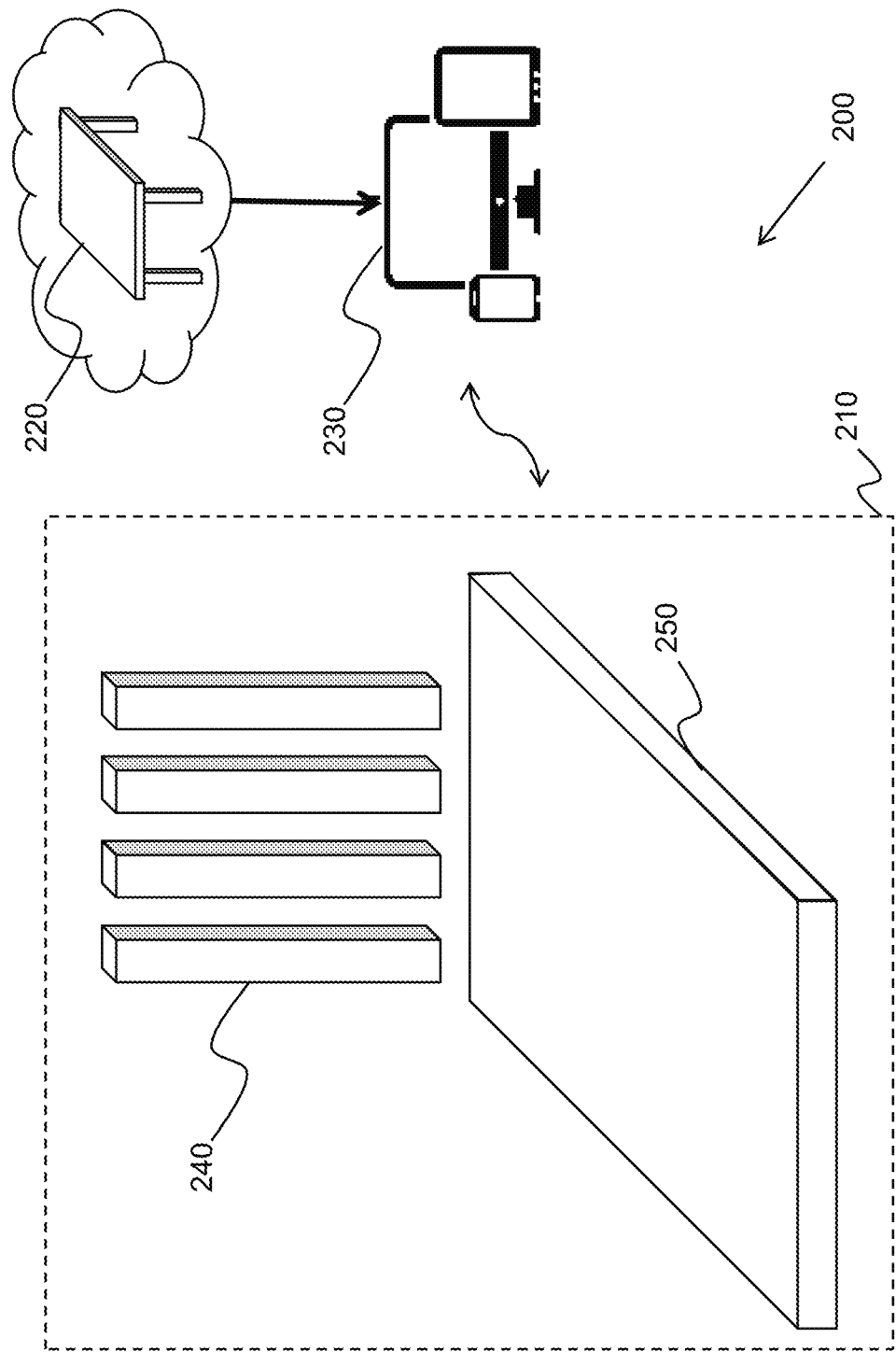

FIGS. 2A and 2B depict an apparatus 200 relating to flat-pack furniture, in accordance with embodiments of the present invention. The apparatus 200 comprises a plurality of components 210 adapted to be fitted together to create a modular structure according to a construction plan 220. Each component comprises a communication interface and an output interface adapted to generate sensory signals. The apparatus further comprises a controller 230.

In FIG. 2A, and by way of example only, the modular structure to be assembled may be a table, wherein the plurality of components 210 comprises four legs 240 and a tabletop 250. Other examples of modular structures may include: a chair; a bed; a desk; or any other piece of furniture that may be provided to a user in a disassembled form. The plurality of components 210 is adapted to communicate with the controller 230 to establish an availability of the plurality of components (e.g., information descriptive of the available components) for the structure.

FIG. 2B shows a partially assembled modular structure 260. The components in use by the modular structure remain in communication with the controller 230. However corresponding availability information as to availability of the components may indicate that the components are in use. For example, initially the availability information may have indicated that the plurality of components included a tabletop 250 and four identical legs 240 (see FIG. 2A). The four identical legs may have been listed as individual components, or may have been combined into a group of similar components. As each leg is used in the assembly of the modular structure 260, the availability of components may be updated to indicate which legs are in use and which are available. Each leg may possess an individual identifier as part of the availability information.

The controller 230 is adapted to determine a target component 270 from the plurality of components based on the construction plan 220 and the availability of the plurality of components. In one embodiment, the target component is the final leg to be attached to the table in order to complete the structure. The output interface of the target component is adapted to generate a first sensory signal for indicating the target component to a user. For example, the table leg may be adapted to emit light of a given color to indicate that it is the target component for use in the current stage of assembling the table. In addition, or alternatively, the table leg may emit audible and/or haptic signals in order to provide an indication to the user.

Figure 4:
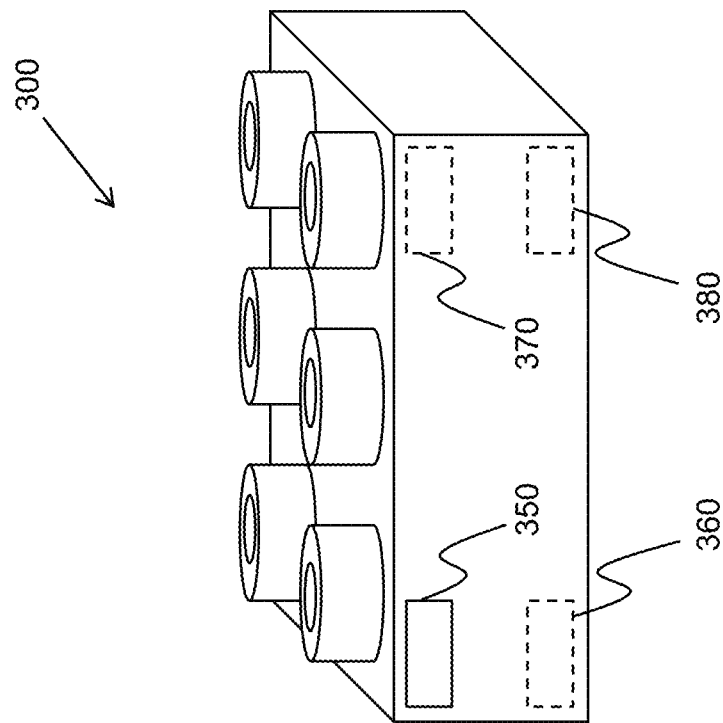
FIGS. 3 and 4 depict components relating to toy building blocks, in accordance with embodiments of the present invention.
Figure 3:
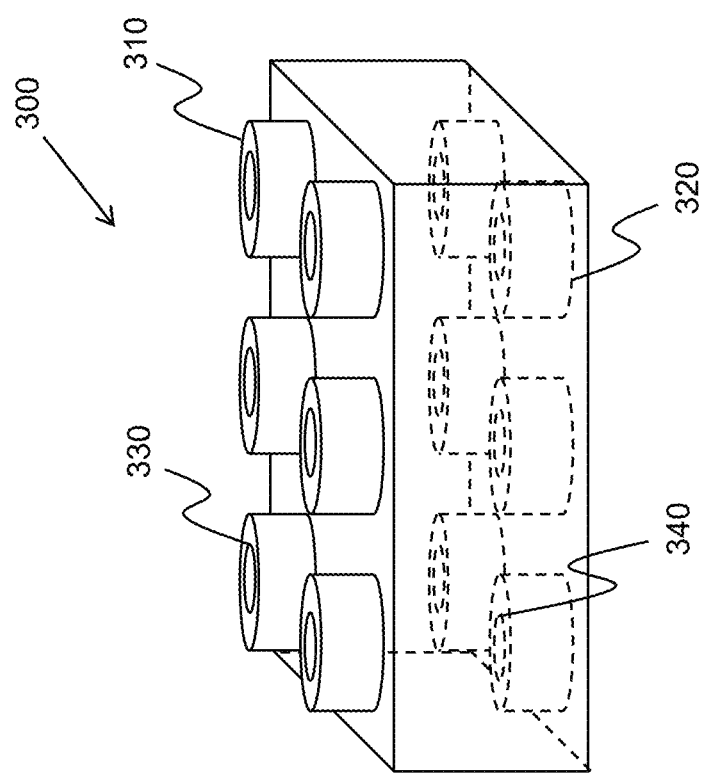

FIGS. 3 and 4 depict components relating to toy building blocks, in accordance with embodiments of the present invention.

FIG. 3 depicts a component in the form of a toy building block 300, wherein the building block comprises a male connection portion 310 at an upper end and a female connection portion 320 at a lower end which is releasably mateable with the male connection portion of another building block. In a first configuration, a first building block may be connectable on top of a second building block and, in a second configuration; the second building block may be connectable on top of the first building block. A plurality of toy building blocks may be provided to be assembled into a modular structure according to a construction plan.

The toy building block 300 comprises an output interface 330 adapted to generate sensory signals. In some cases, the output interface 330 may be located on the male connection portion 310 of a building block and comprise an LED in order to generate a visual signal for the user. In further examples, the output interface may comprise a speaker, to generate an audible signal, and/or a motor, to generate a haptic signal.

The toy building block 300 may further comprise a detection unit 340, adapted to detect placement of the component adjacent another component may, for example, be located on the female connection 340. In this case, the detection unit 340 may comprise a light detector adapted to determine an arrangement of the target component adjacent another component based on the detected light, such as the detected color and/or variation of the light over time.

The locations of the output interface and detection units may differ across various embodiments of the components. For example, the output interface may be located on the female connection portion and the detection unit 340 may be located on the male connection portion. In further example, both the output interface and the detection unit 340 may be located on the male and/or female connection portions.

FIG. 4 illustrates further details of the toy building block 300 shown in FIG. 3.

The toy building block further comprises a communication interface 350 adapted to communicate with a controller to establish an availability of the components for the structure. The communication interface may communicate with the controller via WiFi®, Bluetooth® or any other suitable wireless communication link. The sensors and interfaces within the toy building block may all be linked to the communication interface, which may then send and receive data to and from the controller.

In some cases, the component may also include an interaction sensor 360 adapted to detect user interaction with the component. The interaction sensor may be a motion sensor, which may comprise an accelerometer or any other suitable motion detector.

In some cases, one component of the plurality of components may include a processor 370, thereby allowing the component, such as the toy building block 300, to function as the controller. In this case, the component acts as a 'master' component which is in contact with the rest of the plurality of components.

In order to provide power to the various systems, the toy building block may further comprise a power source 380.

The detection unit 340 and interaction sensor 360 may be adapted to capture data relating to the component and provide the data to the controller. This sensor data may then be compared to the building plan and used to assess the validity of the user's action, such as the placement of a toy building block 300. Based on the assessment, the user may then be provided with feedback indicating whether or not the user's action was valid.

Figure 5A:
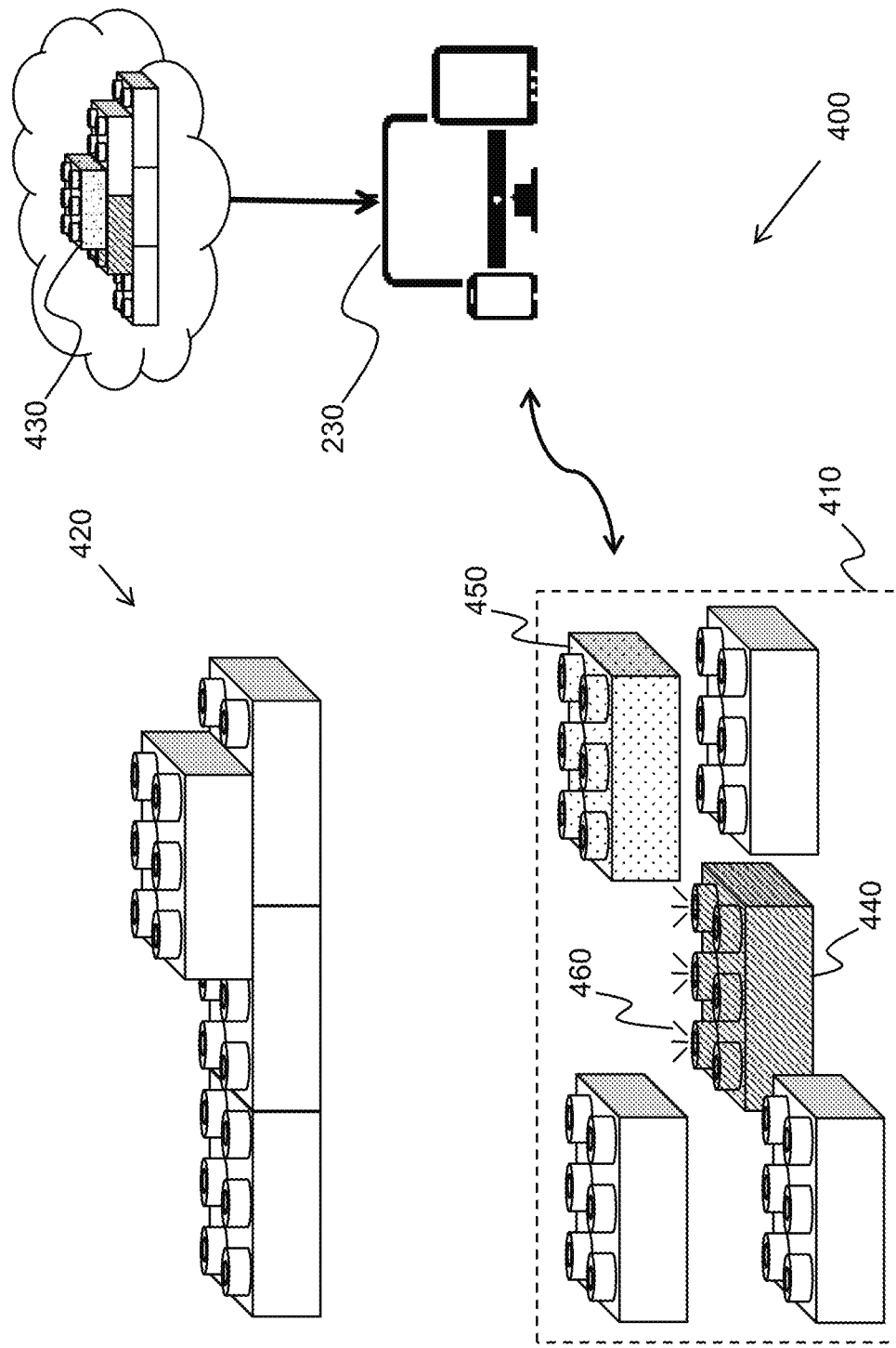
Figure 5B:
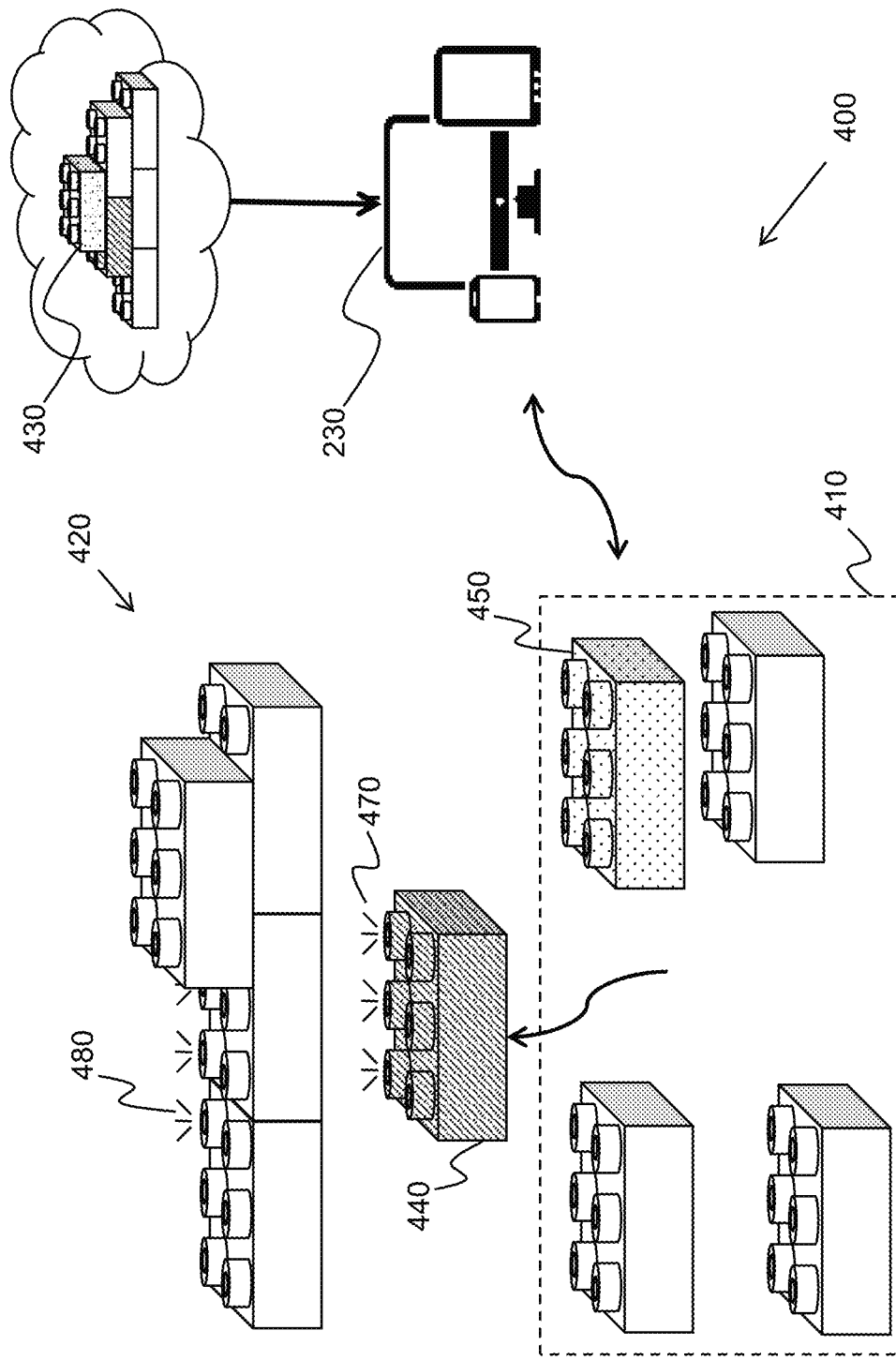

FIGS. 5A to 5C depict an apparatus relating to the toy building blocks shown in FIGS. 3 and 4, in accordance with embodiments of the present invention.

FIG. 5A depicts an apparatus 400 for assembling a modular structure. The apparatus includes a controller 230, a plurality of components 410 in the form of toy building blocks and a partially assembled modular structure 420 according to a construction plan 430 obtained by the controller. Each component of the plurality of components may include an interaction sensor, such as a motion sensor.

From the construction plan 430, it may be seen that a first component 440 and a second component 450 are required to fully assemble the modular structure. The controller 230 communicates with the plurality of components 410 in order to establish the availability of the components. The controller 230 may also communicate with the components comprising the partially constructed modular structure 420. In this way, the controller 230 may determine that there are nine components in total, all of which share the same shape and size. Seven of the components are white, one component comprises a cross hatch pattern and one component comprises a dot pattern. Four of the white components are in use as part of the partially assembled modular structure 420 and the remaining components are not in use. The preceding information may be stored in a table by the controller 230.

Based on the availability and the construction plan, the controller 230 may determine that the first component 440 is the target component for the current stage of assembly. This determination may then be communicated to the first component, which generates a first sensory signal 460 in order to indicate the first component to the user. As discussed above, the first sensory signal may be any combination of a visual, audible and/or haptic signal. In one embodiment, the first sensory output may simply be a steady white light.

FIG. 5B depicts the apparatus 400 at a stage where the user has picked up the target component determined in FIG. 5A.

In this case, the first component 440, which is the target component, may comprise a motion sensor adapted to detect movement of another component. In one embodiment, the movement of the other component may be due to interaction of the user with the other component. This detection may then be communicated to the controller 230, which may then determine if the detected movement of the moved component adheres to the construction plan. In one embodiment, the controller 230 checks whether the user is moving the target component. The controller 230 may then indicate the determination result to the target component, which may then generate a third sensory signal for indicating if the movement of the moved component adheres to the construction plan.

In the case that the user is moving the wrong component, the third sensory signal may comprise a first combination of signals, a simple example of which may be a steady red light. In the example shown, the correct component has been selected, which may then generate an appropriate third sensory signal to indicate this to the user, such as a steady green light.

Additionally, the controller 230 may determine a placement component based on a construction plan and the availability of the plurality of components. By way of example, the controller 230 may determine which four components comprise the partially assembled modular structure and their adjacency to each other. From this and the construction plan 430, the controller 230 may determine where the first component 440 should be placed. Responsive to this determination, the placement component may generate a fourth sensory output signal, such as a steady blue light, 480 for indicating the placement component to a user. In FIG. 5B, the placement location partially spans two components, meaning that both components may generate the fourth sensory output signal. In some cases, such as the depicted example, the components may be able to limit the area of emission of the sensory signals to specific portions of the components. In this way, the user is provided with a more accurate indication of the placement component.

FIG. 5C depicts the apparatus at a stage where the user has placed the target component determined in FIG. 5A on the placement component determined in FIG. 5B.

The components in this example may comprise a detection unit adapted to detect placement of the component adjacent another component. In this way, the first component 440 may detect the components adjacent to the first component 440 and/or the surrounding components may detect the placement of the first component 440. This detection of adjacent components may be communicated to the controller, which may then determine whether the first component has been placed in the correct location according to the construction plan 430. A fourth sensory signal 490 may be generated by the first component in order to indicate whether the placement of the first component has been determined to be correct.

For an incorrect placement location, the first component 440 may generate a first set of signals, such as a flashing red light; whereas, for a correct placement location, the first component may generate a different signal, such as a flashing green light.

The detection unit 340 may comprise a light sensor, thereby allowing the controller to determine an arrangement of the target component adjacent another component based on the detected light, such as the color of the detected light and/or a variation of the detected light over time. For example, if the light sensor is located in the female connecting portion of the first component, the detection of the steady blue light emitted by the placement component may indicate that the target component has been placed in the correct location.

In some cases, multiple sensory signals may be active at any one time. For example, the output interfaces of the toy building blocks depicted in FIGS. 5A to 5C may comprise six LEDs.

These six LEDs may all generate the same sensory signal, or the six LEDs may operate independently. Returning to the sensory signal described above, if the correct component detects user interaction but is placed in the wrong location, three LEDs may emit a steady green light while the remaining three LEDs may emit a flashing red light.

Following the placement of the first component 440, the controller 230 may update the availability of the plurality of components 410 to indicate that the first component is now in use. In this way, the controller may then determine that the next target component is the second component 450 according to the construction plan 430 and the updated availability. In response, the second component may generate a first sensory signal to indicate the second component to the user and the method described above may repeat.

Figure 6B:
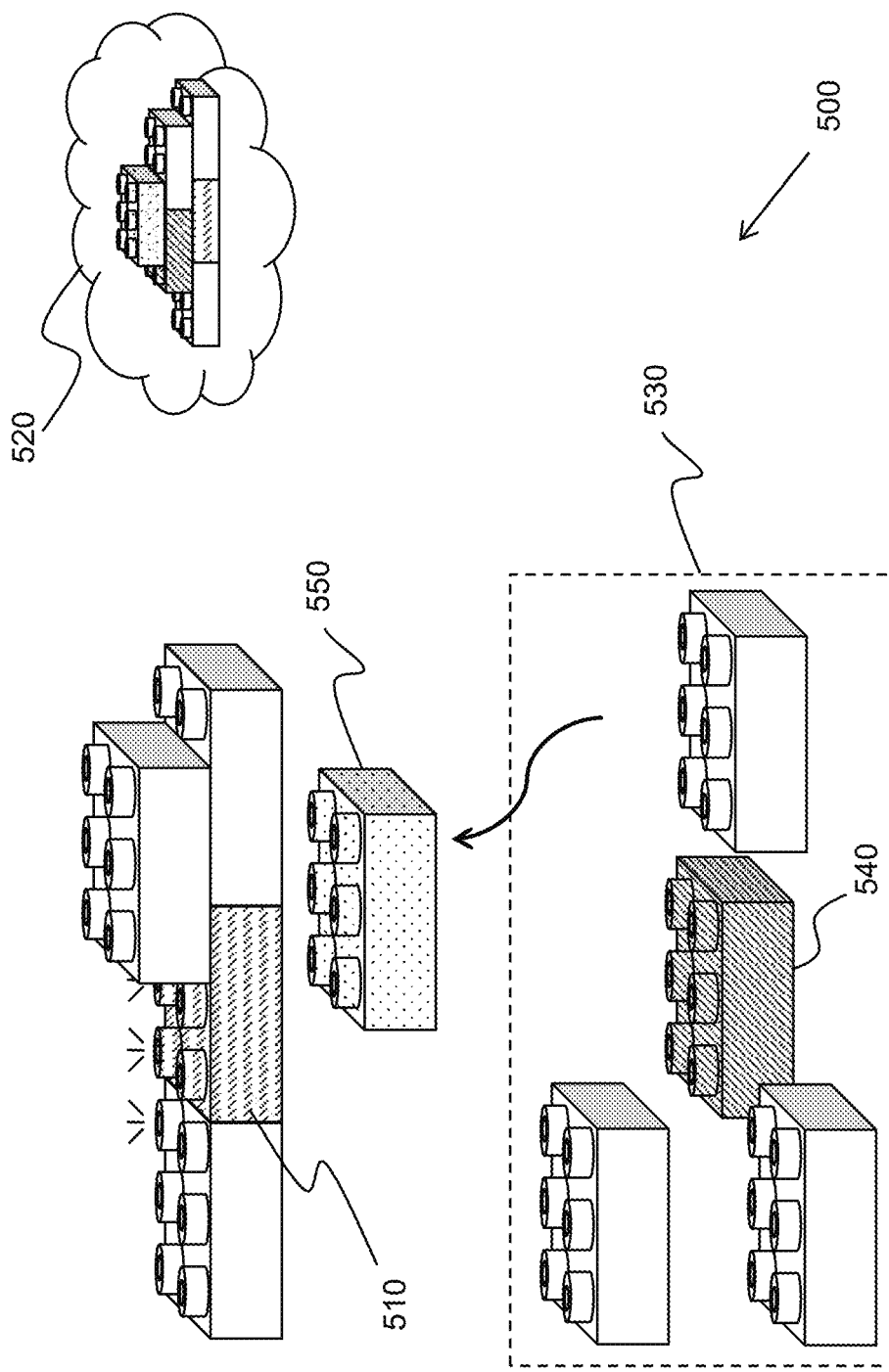
Figure 6C:
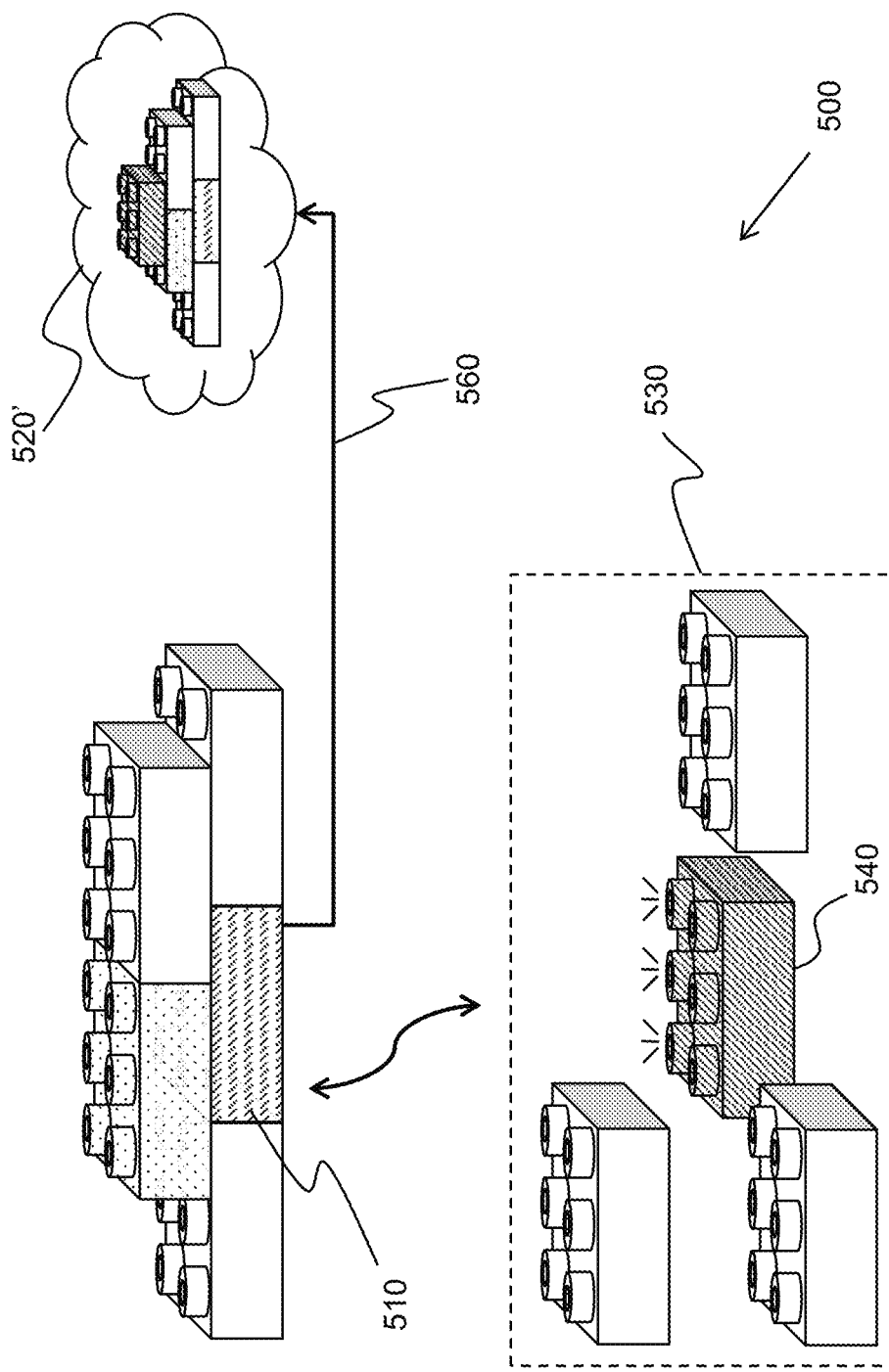

FIGS. 6A to 6C depict an apparatus 500 that is similar to the apparatus 400 in FIGS. 5A to 5C, in accordance with embodiments of the present invention. However in FIGS. 6A to 6C, the controller is integrally formed within a master block 510. The construction 520 plan may be pre-installed onto the master block; accessed by the master block; or uploaded by the user.

As in FIGS. 5A to 5C, the master block 510 may communicate with the plurality of components 530 in order to establish the availability of the plurality of components. A target component 540 may then be indicated based on the availability and the construction plan as shown in FIG. 6A.

FIG. 6B depicts the apparatus 500 where the user has selected an incorrect component 550 rather than the previously indicated target component 540, which may be communicated to the controller. However, the controller may determine that, as the use of a different component would not lead to a structural change in the construction plan 520, the user does not need to be alerted.

Alternatively, the second component 550 may generate a purely haptic feedback to indicate to the user that the wrong component has been selected, which may be relevant to the case where the user, a child for instance, may be embarrassed to have selected the incorrect component. By producing a purely haptic feedback, the child may be subtly informed of the mistake, without alerting anyone else.

As in FIGS. 5A to 5C, a placement component may be determined by the controller and indicated to the user by way of a sensory signal.

FIG. 6C depicts the apparatus 500 where the user has placed the incorrect component. The master block 510 may once again communicate with the plurality of components 530 and update 560 the construction plan 520 in order to compensate for the user's mistake.

By way of compensation, the master block may determine that in order to remain as close to the original construction plan 520 as possible, the target component 540 should be used in the following stage of assembly and so is once again indicated to the user.

Although FIGS. 3 to 6C depict an example of the method relating to toy building blocks, the method may be applied to assembling any modular structure from a plurality of components.

Figure 7:
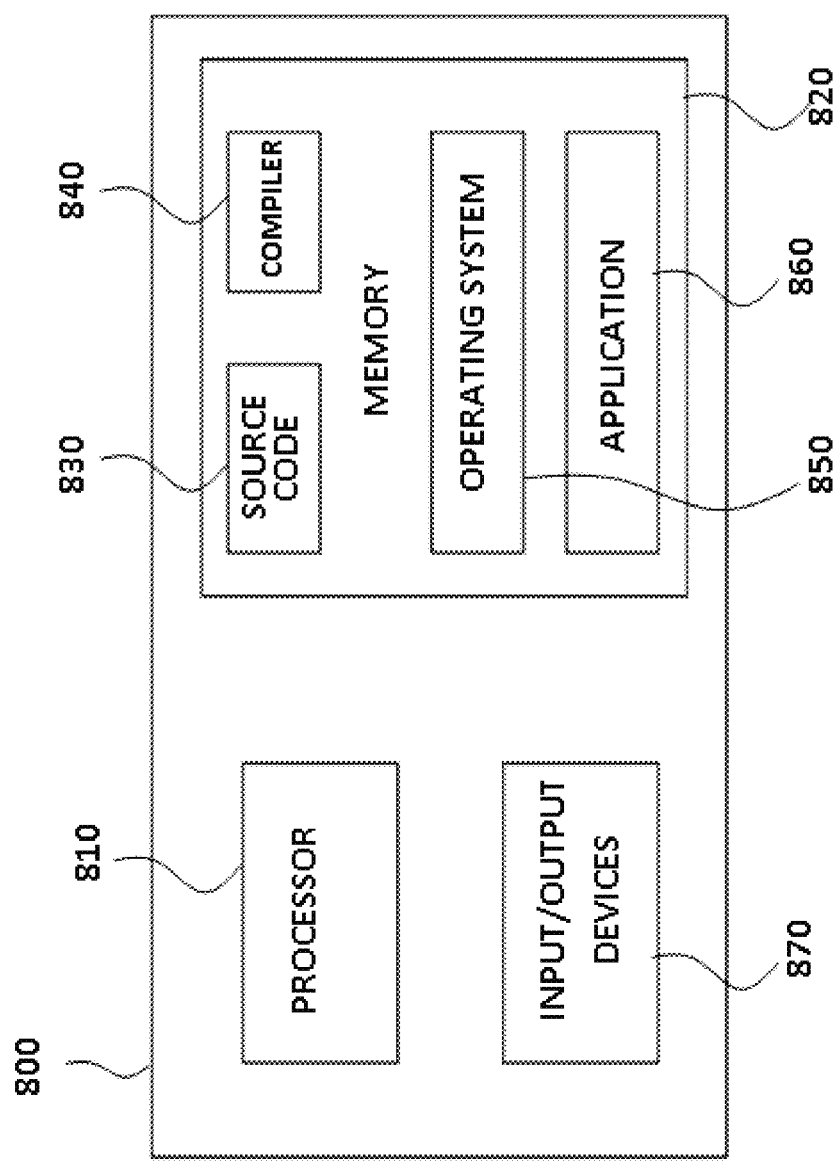
FIG. 7 illustrates an example of a computer system for implementing methods of the present invention.

FIG. 7 illustrates an example of a computer system 800 for implementing methods of the present invention. Various operations discussed above may utilize the capabilities of the computer system 800. For example, one or more parts of an apparatus for assembling a modular structure may be incorporated in any element, module, application, and/or component discussed herein.

The computer system 800 includes, but is not limited to, PCs, workstations, laptops, PDAs, palm devices, smartphones, image capture devices, video capture devices, internet-enabled displays, servers, storages, and the like. Generally, in terms of hardware architecture, the computer system 800 may include one or more processors 810, one or more memories 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer system 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer system 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer system 800 comprises a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer system 800 is activated.

When the computer system 800 is in operation, the processor 810 is configured to execute software stored within the memory 820, to communicate data to and from the memory 820, and to generally control operations of the computer system 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or device.

In the context of the present application, where embodiments of the present invention constitute a method, it should be understood that such a method is a process for execution by a computer, i.e. is a computer-implementable method. The various steps of the method therefore reflect various parts of a computer program; e.g., various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible hardware device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assembling a modular structure from a plurality of components configured to be fitted together to create the modular structure in accordance with a construction plan, each component comprising: a communication interface; and an output interface configured to generate sensory signals, said method comprising:

the plurality of components communicating, via the communication interface of each component, with a controller to establish an availability of the plurality of components for the modular structure;

determining, at the controller, a target component from the plurality of components based on the construction plan and the availability of the plurality of components, wherein the target component is a starting component used for initiating creation of the modular structure in accordance with the construction plan;

sending, by the controller to the target component, a first communication that the target component is the starting component used for initiating creation of the modular structure in accordance with the construction plan;

in response to the target component having received the first communication from the controller, generating, by the output interface of the target component, a first sensory signal indicating to a user that the target component is the starting component used for initiating creation of the modular structure in accordance with the construction plan;

after said generating the first sensory signal, detecting, by a motion sensor, that a first component of the plurality of component is currently moving which is indicative of the first component being interacted with by the user; and generating, by the output interface of the currently moving first component, a fourth sensory signal indicating whether or not the currently moving first component is the target component.

2. The method of claim 1, wherein each component of the plurality of components further comprises a detection unit configured to detect placement of each component adjacent to another component, said method further comprising:

in response to detecting, by the detection unit of any component in the modular structure, that the target component is adjacent to another component within the modular structure, determining if the target component adjacent to another component conforms to the construction plan; and generating a second sensory signal indicating if the target component adjacent to another component within the modular structure conforms to the construction plan.

3. The method of claim 2, wherein the second sensory signal indicates that the target component adjacent to another component within the modular structure does not conform to the construction plan.

4. The method of claim 2, said method further comprising:

in response to said determining that the target component being adjacent to another component conforms to the construction plan, updating the availability of the plurality of components.

5. The method of claim 2, wherein the detection unit comprises a light sensor, said method further comprising:

in response to detecting light incident on the light sensor, ascertaining, based on the detected light, that the target component is adjacent to the other component.

6. The method of claim 5, wherein said ascertaining is further based on a color of the detected light; a variation of the detected light over time, or a combination thereof.

7. The method of claim 1, wherein the plurality of components comprises a first building block and a second building block of a toy set.

8. The method of claim 7, wherein each building block comprises a male connection portion at an upper end and a female connection portion at a lower end which is releasably mateable with the male connection portion of another building block, wherein the first building block is connectable on top of the second building block in a first configuration, and wherein the second building block is connectable on top of the first building block in a second configuration.

9. The method of claim 1, wherein the first sensory signal comprises one or more signals selected from the group consisting of an audible signal, a visual signal, a haptic signal, and combinations thereof.

10. The method of claim 1, wherein each component of the plurality of components further comprises an interaction sensor configured to detect user interaction with each component, said method further comprising:

in response to detecting user interaction with a component, determining that the detected user interaction with the component conforms to the construction plan; and generating a third sensory signal indicating that the user interaction with the component conforms to the construction plan.

11. The method of claim 1, said method further comprising:

determining, at the controller and based on the construction plan and the availability of the plurality of components, a placement component from the plurality of components; and generating, with the output interface of the placement component, a fourth sensory output signal indicating the placement component to the user.

12. The method of claim 1, wherein the availability comprises component information for each component of the plurality of components, and wherein the component information for a component comprises information describing an aspect of the component, said aspect of the component selected from the group consisting of an identifier of the component, a physical attribute of the component; a capability of the component; a use status of the component; a connected status of the component; and an adjacent component of the component.

13. A computer program product, comprising one or more computer readable hardware storage devices having computer readable program code stored therein, said program code containing instructions executable by one or more processors of a computer system to implement a method for assembling a modular structure from a plurality of components configured to be fitted together to create the modular structure in accordance with a construction plan, each component comprising an output interface configured to generate sensory signals, said method comprising:

said plurality of components communicating, via the communication interface of each component, with a controller to establish an availability of the plurality of components for the modular structure;

determining, at the controller, a target component from the plurality of components based on the construction plan and the availability of the plurality of components, wherein the target component is a starting component used for initiating creation of the modular structure in accordance with the construction plan;

sending, by the controller to the target component, a first communication that the target component is the starting component used for initiating creation of the modular structure in accordance with the construction plan;

in response to the target component having received the first communication from the controller, generating, by the output interface of the target component, a first sensory signal indicating to a user that the target component is the starting component used for initiating creation of the modular structure in accordance with the construction plan;

after said generating the first sensory signal, detecting, by a motion sensor, that a first component of the plurality of component is currently moving which is indicative of the first component being interacted with by the user; and generating, by the output interface of the currently moving first component, a fourth sensory signal indicating whether or not the currently moving first component is the target component.

14. The computer program product of claim 13, wherein each component of the plurality of components further comprises a detection unit configured to detect placement of each component adjacent to another component, said method further comprising:

in response to detecting, by the detection unit of any component in the modular structure, that the target component is adjacent to another component within the modular structure, determining if the target component adjacent to another component conforms to the construction plan; and generating a second sensory signal indicating if the target component adjacent to another component within the modular structure conforms to the construction plan.

15. The computer program product of claim 14, wherein the second sensory signal indicates that the target component adjacent to another component within the modular structure does not conform to the construction plan.

16. The computer program product of claim 14, said method further comprising:

in response to said determining that the target component being adjacent to another component conforms to the construction plan, updating the availability of the plurality of components.

17. A computer system, comprising one or more processors, one or more memories, and one or more computer readable hardware storage devices, said one or more hardware storage device containing program code executable by the one or more processors via the one or more memories to implement a method for assembling a modular structure from a plurality of components configured to be fitted together to create the modular structure in accordance with a construction plan, each component comprising an output interface configured to generate sensory signals, said method comprising:

said plurality of components communicating, via the communication interface of each component, with a controller to establish an availability of the plurality of components for the modular structure;

determining, at the controller, a target component from the plurality of components based on the construction plan and the availability of the plurality of components, wherein the target component is a starting component used for initiating creation of the modular structure in accordance with the construction plan;

sending, by the controller to the target component, a first communication that the target component is the starting component used for initiating creation of the modular structure in accordance with the construction plan;

in response to the target component having received the first communication from the controller, generating, by the output interface of the target component, a first sensory signal indicating to a user that the target component is the starting component used for initiating creation of the modular structure in accordance with the construction plan;

after said generating the first sensory signal, detecting, by a motion sensor, that a first component of the plurality of component is currently moving which is indicative of the first component being interacted with by the user; and generating, by the output interface of the currently moving first component, a fourth sensory signal indicating whether or not the currently moving first component is the target component.

18. The computer system of claim 17, wherein each component of the plurality of components further comprises a detection unit configured to detect placement of each component adjacent to another component, said method further comprising:

in response to detecting, by the detection unit of any component in the modular structure, that the target component is adjacent to another component within the modular structure, determining if the target component adjacent to another component conforms to the construction plan; and generating a second sensory signal indicating if the target component adjacent to another component within the modular structure conforms to the construction plan.

19. The computer system of claim 18, wherein the second sensory signal indicates that the target component adjacent to another component within the modular structure does not conform to the construction plan.

20. The computer system of claim 18, said method further comprising:

in response to said determining that the target component being adjacent to another component conforms to the construction plan, updating the availability of the plurality of components.

21. An apparatus for assembling a modular structure in accordance with a construction plan, said apparatus comprising:

a plurality of components configured to be fitted together to create the modular structure, each component comprising: a communication interface; and an output interface configured to generate sensory signals; and a controller, wherein the plurality of components are configured to communicate, via the communication interface of each component, with the controller to establish an availability of the plurality of components for the modular structure, wherein the controller is configured to determine a target component from the plurality of components based on the construction plan and the availability of the plurality of components, wherein the target component is a starting component used for initiating creation of the modular structure in accordance with the construction plan, wherein the controller is configured to send, to the target component, a first communication that the target component is the starting component used for initiating creation of the modular structure in accordance with the construction plan, wherein the output interface of the target component is configured to generate, in response to the target component having received the first communication from the controller, a first sensory signal indicating to a user that the target component is the starting component used for initiating creation of the modular structure in accordance with the construction plan, wherein a motion sensor is configured to detect, after the first sensory signal is generated, that a first component of the plurality of component is currently moving which is indicative of the first component being interacted with by the user; and wherein the output interface of the currently moving first component is configured to generate a fourth sensory signal indicating whether or not the currently moving first component is the target component.

22. The apparatus of claim 21, wherein each component of the plurality of components further comprises a detection unit configured to detect placement of each component adjacent another component, wherein, in response to detecting, by the detection unit of any component in the modular structure, that the target component is adjacent to another component within the modular structure, the apparatus is configured to determine that the target component adjacent to another component conforms to the construction plan, and to generate a second sensory signal indicating that the target component adjacent to another component within the modular structure conforms to the construction plan.

23. The apparatus of claim 22, wherein the detection unit comprises a light sensor, and wherein, in response to detecting light incident on the light sensor, the apparatus is configured to ascertain, based on the detected light, that the target component is adjacent to the other component.

24. A component configured to be fitted together with one more other components to create a modular structure in accordance with a construction plan, said component comprising:
- a communication interface; and
- an output interface configured to generate sensory signals,
- wherein a plurality of components consists of the component and the one more other components,
- wherein the component is configured to receive, from the controller, a first communication that the component is an only target component that is a starting component used for initiating creation of the modular structure in accordance with the construction plan,
- wherein the output interface of the component is configured to generate, in response to the component having received the first communication from the controller, a first sensory signal indicating to a user that the component is the only target component that is the starting component used for initiating creation of the modular structure in accordance with the construction plan,
- wherein a motion sensor is configured to detect, after the first sensory signal is generated, that a first component of the plurality of component is currently moving which is indicative of the first component being interacted with by the user; and
- wherein the output interface of the currently moving first component is configured to generate a fourth sensory signal indicating whether or not the currently moving first component is the target component.

25. The component of claim 24, wherein the component comprises a toy building block.

* * * * *